(12) United States Patent
Kuo et al.

(10) Patent No.: US 11,088,864 B1
(45) Date of Patent: *Aug. 10, 2021

(54) DEVICE SUBCOMPONENT REPRESENTATIONS

(71) Applicant: Amazon Technologies, Inc., Seattle, WA (US)

(72) Inventors: Calvin Yue-Ren Kuo, Irvine, CA (US); Shyam Krishnamoorthy, Redmond, WA (US); Alan Conrad Rawcliffe, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 450 days.

This patent is subject to a terminal disclaimer.

(21) Appl. No.: 15/196,792

(22) Filed: Jun. 29, 2016

(51) Int. Cl.
*H04L 12/28* (2006.01)
*G05B 15/02* (2006.01)

(52) U.S. Cl.
CPC .......... *H04L 12/2816* (2013.01); *G05B 15/02* (2013.01)

(58) Field of Classification Search
CPC ......... H04L 67/12; H04L 67/22; H04L 67/26; G16Y 40/30; G16Y 20/20
See application file for complete search history.

(56) References Cited

U.S. PATENT DOCUMENTS

| | | | |
|---|---|---|---|
| 7,565,433 B1 | 7/2009 | Lamport | |
| 7,620,680 B1 | 11/2009 | Lamport | |
| 7,680,836 B2 | 3/2010 | Anderson et al. | |
| 7,720,509 B2 | 5/2010 | Famolari | |
| 7,797,324 B2 | 9/2010 | Miyoshi | |
| 8,107,397 B1 | 1/2012 | Bagchi et al. | |
| 2004/0025018 A1 | 2/2004 | Haas et al. | |
| 2004/0158723 A1 | 8/2004 | Root | |
| 2005/0055405 A1* | 3/2005 | Kaminsky | H04L 51/04 709/206 |
| 2007/0203997 A1 | 8/2007 | Ingerman et al. | |
| 2008/0084294 A1 | 4/2008 | Zhiying et al. | |
| 2009/0006597 A1 | 1/2009 | Bade et al. | |
| 2009/0125591 A1* | 5/2009 | Kirkpatrick | H04L 51/04 709/206 |
| 2009/0216910 A1 | 8/2009 | Duchesneau | |
| 2012/0209968 A1* | 8/2012 | Lawson | G06F 9/5072 709/220 |
| 2017/0070361 A1* | 3/2017 | Sundermeyer | H04L 12/2818 |
| 2018/0278607 A1* | 9/2018 | Loladia | H04L 61/1588 |
| 2019/0339955 A1* | 11/2019 | Kuo | H04L 67/16 |

\* cited by examiner

*Primary Examiner* — Hitesh Patel
(74) *Attorney, Agent, or Firm* — Knobbe, Martens, Olson & Bear, LLP

(57) ABSTRACT

A technology is described for a device shadowing service that manages device states. An example method may include receiving a state change message associated with a device that a subcomponent of the device has assumed a first state. In response to the state change message, a subcomponent representation associated with a device representation may be updated to indicate the first state received, where the device representation represents the device and the subcomponent representation represent the subcomponent of the device. Thereafter, a request may be received for the first state of the subcomponent of the device. The first state indicated by the subcomponent representation associated with the device representation may be determined, and the first state may be returned in response to the request.

21 Claims, 8 Drawing Sheets

DEVICE SUBCOMPONENT REPRESENTATIONS

RELATED APPLICATIONS

This application is related to U.S. Utility patent application entitled "DEVICE REPRESENTATION MANAGEMENT USING REPRESENTATION TYPES" filed concurrently on Jun. 29, 2016, and is incorporated by reference herein.

BACKGROUND

Electronic devices have become ever-present in many aspects of society. During the course of a normal day, a person may use a smart phone, a tablet device, and a laptop computer. Automobiles and commercial vehicles have also come to rely upon electronic systems to control and monitor many features and operations. Modern home appliances such as, washers, dryers, and refrigerators may be driven and controlled by electronic systems. Manufacturing facilities, building heating and cooling systems, farming equipment, and many other electronic systems may now rely upon electronic sensors and control systems.

Advancements in communication technologies have allowed for even relatively simple electronic devices to communicate with other devices and computing systems over a computer network. For example, an electronic device in a manufacturing system may monitor various aspects of the manufacturing process and communicate monitoring data to other devices in the manufacturing system. Similarly, electronic sensors embedded in a building control system may monitor and communicate details regarding operation of the building's heating, cooling, and ventilation systems. Even home appliances and light switches offer the possibility of being configured with communication capabilities for the purpose of transmitting status and receiving external control communications.

DETAILED DESCRIPTION

Figure 1:
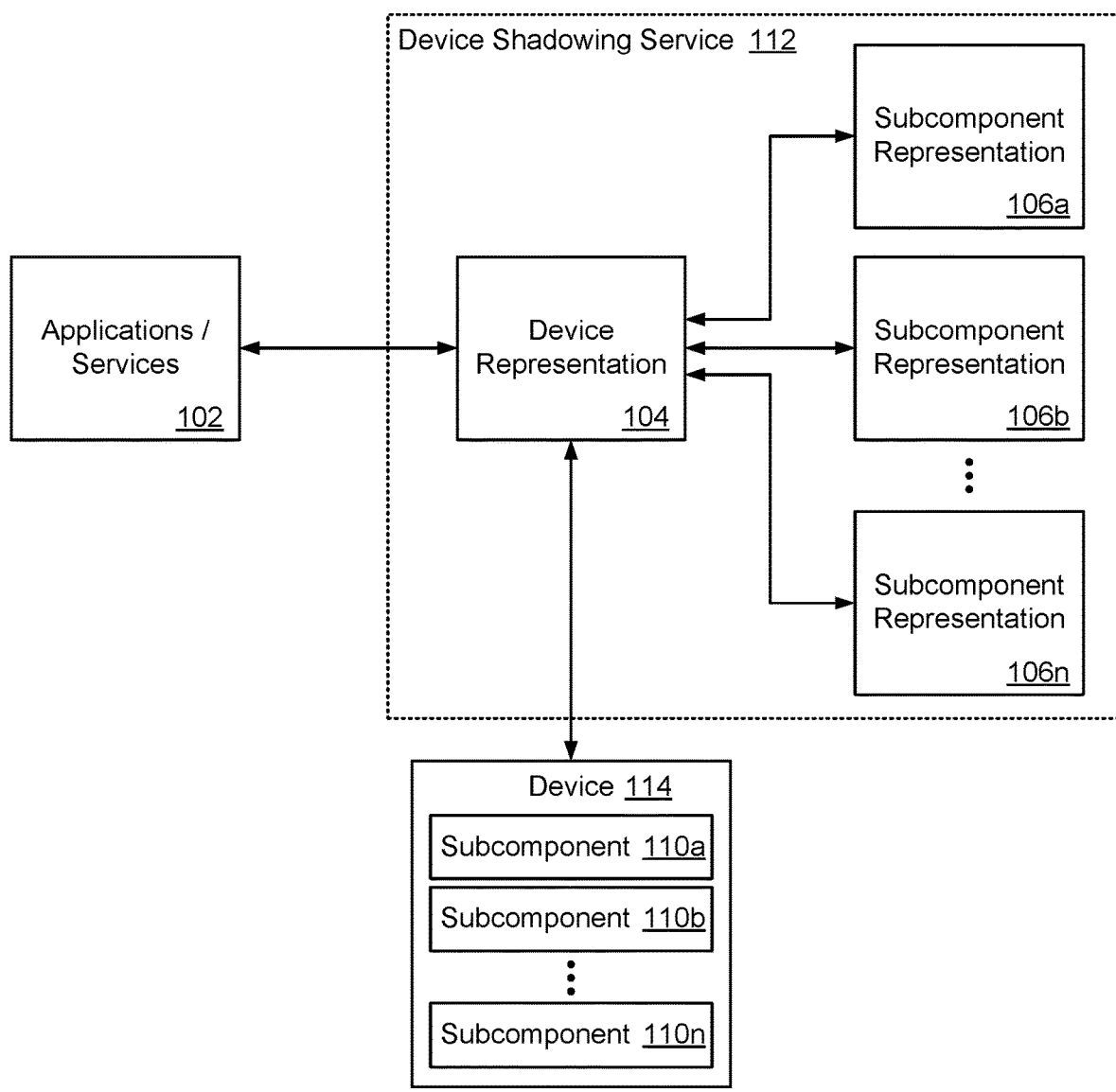
FIG. 1 is a block diagram illustrating an example flow for communicating with a device shadowing service used to manage a device representation that includes subcomponent representations.

A technology is described for a device shadowing service used to manage device representations and subcomponent representations associated with devices that include subcomponents that may be network addressable and/or ultimately addressable (e.g., capable of receiving relayed messages). A device may be one of many devices that create a large network of addressable devices. This "network" is commonly referred to as the Internet of Things (IoT). A state of a device and subcomponents of the device may be electronically represented within the device shadowing service using a device representation and subcomponent representations in a service provider environment.

A device representation and subcomponent representations may be data objects that represent the state of a device that includes physical device subcomponents (referred to herein as "device subcomponents"). For example, a device may include multiple device subcomponents, where each device subcomponent may have an individual state. As an illustration, a network addressable vehicle may be a collection of devices that include: an engine, lights, doors, windows, and sensors. Each of the vehicle subcomponents may have a state, such as: "on", "off", "open", "closed", etc. A device representation may be used to represent the vehicle, and subcomponent representations may be used to represent a state for each vehicle subcomponent.

A device may report state changes and other information associated with the device's subcomponents to the device shadowing service, and the reported information may be stored within subcomponent representations associated with the device. In one example, a subcomponent representation may represent a recorded state and a desired state of a device subcomponent. The recorded state may be the last known state of the device subcomponent and the desired state may be a state to which the device subcomponent may be instructed to assume.

The device shadowing service may receive messages from devices indicating current states of device subcomponents, for which recorded states may be set, and the device shadowing service may receive messages from devices, applications and/or services indicating desired states for device subcomponents. In one scenario, the device shadowing service may receive a message from an application or service requesting that a subcomponent representation be updated to a desired state. In response to the message, the subcomponent representation may be updated to the desired state and a subcomponent of a device associated with the subcomponent representation may be instructed to assume the state of the subcomponent representation. Thereafter, the device shadowing service may receive a message from the device indicating that the device subcomponent has assumed the desired state and the recorded state of the subcomponent representation may be updated to the desired state.

In another scenario, the device shadowing service may receive a message from a device that a device subcomponent has changed state. In response to the message, a subcomponent representation associated with the device subcomponent may be updated to represent the state of the device subcomponent. More specifically, the recorded state of the subcomponent representation may be updated to the state indicated in the message. As such, an application or service may be provided with the recorded state of the subcomponent representation when a request for the current state of the device subcomponent is made to the device shadowing service.

FIG. 1 is a block diagram illustrating an example flow for communicating with a device shadowing service 112 used to manage a device representation 104 that includes subcomponent representations 106a-n. The device representation 104 may be associated with a device 114 that includes device subcomponents 110a-n. The device shadowing service 112 may be in network communication with the device 114 and with applications and services 102 that query and/or update the subcomponent representations 106a-n included in the device representation 104. While one device 114 and associated device representation 104 are shown, the device shadowing service 112 may manage hundreds, thousands, or more device representations 104 associated with respective device 114.

In one example, the device 114 may be registered with the device shadowing service 112. In registering the device 114, a device representation 104 may be created for the device 114. The device representation 104 may include subcomponent representations 106a-n associated with subcomponents 110a-n of the device 114. As an illustration, a network addressable security device may include a camera subcomponent, a microphone subcomponent, and a motion detector subcomponent. In registering the security device with the device shadowing service 112, a device representation 104 that represents the security device may be created and a subcomponent representation 106a-n may be created for each of the security device subcomponents (i.e., a camera representation, a microphone representation, and a motion detector representation).

The device representation 104 may be an electronic representation (e.g., a data object) of the device 114 and subcomponents 110a-n that can be referenced via a computer network (e.g., the internet and a virtual network of a service provider environment) and updated, even at times that the device 114 itself may be unreachable. For example, to conserve power, some battery-powered and other devices may disable wireless radios when not actively transmitting data to the device shadowing service 112 or polling the device shadowing service 112 for updates. For these and other reasons, a device 114 may connect to a network only intermittently, while an application or service 102 may attempt to interact with the device 114 at times that the device 114 may not be connected to the network or may not otherwise be available.

In order to overcome limitations associated with intermittent connectivity, bandwidth limitations and computing capacity limitations, the device shadowing service 112 may maintain a cached device representation 104 and subcomponent representations 106a-n of a device 114 and device subcomponents 110a-n that allows an application or service 102 to access information, such as state information, for the device 114 and device subcomponents 110a-n at any time. A device 114 may report state changes and other information for device subcomponents 110a-n to the device shadowing service 112, and the reported information may be stored within respective subcomponent representations 106a-n linked to the device representation 104. For example, the device representation 104 and subcomponent representations 106a-n may be stored as data objects using a data-interchange format like JavaScript Object Notation (JSON) or other data store representations, such as a NoSQL data store or a relational data store. The device representation 104 may include a parent data object and subcomponent representations 106a-n which may include separate data objects that may be addressed through the device representation 104. The cached information included in the subcomponent representations 106a-b may be made available by the device shadowing service 112, as addressed through the device representation 104, to applications and services 102 at any time without the need to wake up or otherwise contact the device 114.

In one example configuration, after registering the device 114 with the device shadowing service 112, state change messages associated with the device 114 may be received at the device shadowing service 112. A state change message may reference (address) a parent device representation 104 and a subcomponent representation 106a-n, and may indicate a current state of a device subcomponent 110a-n of a device 114, or may indicate a desired state for the device subcomponent 110a-n. As one illustration, a motion detector representation for a motion detector subcomponent of a network addressable security device may be updated to a current state of the motion detector subcomponent (e.g., "active" or "non-active") by sending a state change message generated by the security device to the device shadowing service 112 that includes the current state of the motion detector subcomponent. Also, an application or service 102 may update a desired state of the motion detector representation by sending a state change message that includes a desired state for the motion detector representation to the device shadowing service 112.

In response to receiving a state change message, the device shadowing service 112 may be configured to update a subcomponent representation 106a-n to indicate a state received in the state change message. For example, the subcomponent representation 106a-n may be addressed through a device representation 104 associated with a device 114 specified in the state change message and the subcomponent representation 106a-n may be updated to a value indicated in the state change message. In one example, a subcomponent representation 106a-n may include a recorded state and a desired state. A recorded state may represent a current state of a device subcomponent 110a-n as presently known by the device shadowing service 112, and a desired state may represent a state to which a device subcomponent 110a-n is to be instructed to assume.

Applications and/or services 102 may query the device shadowing service 112 to obtain the state of a device representation 104 associated with a device 114 (e.g., an aggregation of states of subcomponent representations 106a-n), or obtain individual states of subcomponent representations 106a-n associated with subcomponents 110a-n of the device 110a-n. In one example, in response to a request for a recorded state of a device 114, the device shadowing service 112 may aggregate the recorded states of the subcomponent representations 106a-n associated with the device 114 and include the aggregation of recorded states into a message that may be sent to an end user (e.g., an application or service 102). As an illustration, an aggregation of states for a network addressable vehicle may include: engine state="on", headlights state="off", doors state="closed", windows state="closed", and climate control state="on".

In another example, an application, service, and/or device may obtain a recorded state of an individual subcomponent representation 106a-n by querying the device shadowing service 112 for the recorded state, (e.g., by addressing the subcomponent representation 106a-n through an associated device representation 104) and the device shadowing service 112 may return the recorded state to the application, service, and/or device. As an illustration, an application on a mobile device may obtain a recorded state of an engine representation (e.g., "on" or "off") associated with a vehicle representation by sending a get state message to the device shadowing service 112 and addressing the engine representation through the vehicle representation. In response, the device shadowing service 112 may return the recorded state of the engine representation, which may be a representation of the current state of the vehicle engine as known to the device shadowing service 112.

Also, applications, services, and/or devices may request that a state of a subcomponent representation 106a-n associated with a subcomponent 110a-n of a device 114 be updated. For example, an application or service 102 may send a state change message that includes a desired state of a subcomponent representation 106a-n to the device shadowing service 112. The subcomponent representation 106a-n may be addressed through a device representation 104 associated with the subcomponent representation 106a-n. As an illustration, the state change message may be published to the example named logical channel (e.g., topic) "$shadow_service/things/device_representation/subcomponent_representation/update" that references a subcomponent representation 106a-n through a linked device representation 104. In receiving the state change message, the device shadowing service 112 may identify the subcomponent representation 106a-n and update the state of the subcomponent representation 106a-n to the desired state included in the state change message. After updating the desired state of the subcomponent representation 106a-n, an associated device 114 may be instructed to have a subcomponent 110a-n associated with the subcomponent representation 106a-n to assume the desired state of the subcomponent representation 106a-n. As an illustration, an engine subcomponent of a network addressable vehicle may be activated using a mobile device application that sends a state change message to the device shadowing service 112, that in response, updates the desired state of an engine representation to "on" or "off", whereupon the device shadowing service 112 instructs the vehicle to turn the engine "on" or "off" according to the desired state.

After a subcomponent 110a-n of a device 114 has assumed a desired state, the device 114 may send a message to the device shadowing service 112 indicating that the subcomponent 110a-n has assumed the desired state. In response to the message, the device shadowing service 112 may update a recorded state of a subcomponent representation 106a-n associated with the subcomponent 110a-n to that of the desired state, such that the recorded state of the subcomponent representation 106a-n represents the current state of the subcomponent 110a-n as currently known to the device shadowing service 112.

Figure 2:
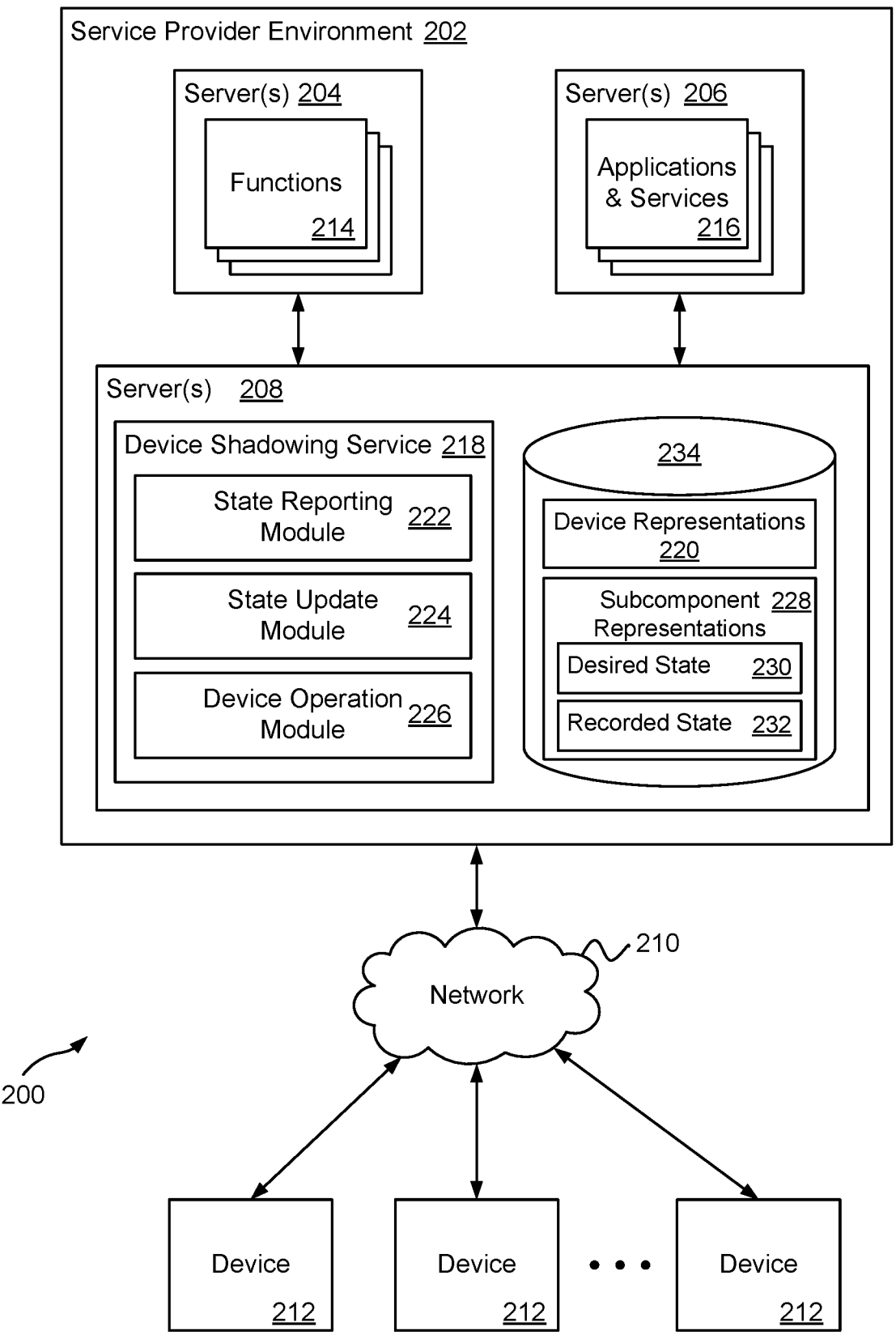
FIG. 2 is a block diagram that illustrates various example components included in a system for a device shadowing service configured to manage device representations having subcomponents associated with device subcomponents.

FIG. 2 illustrates components of an example system environment 200 on which the present technology may be executed. The system environment 200 may include a plurality of devices 212 in communication with a service provider environment 202 via one or more networks 210. Illustratively, the devices 212 can include network addressable: global positioning devices, temperature sensors, water sensors, light switches, light bulbs, power outlets, watches, media players, voice command devices, video cameras, security systems, door locks, smoke alarms, thermostats, weather sensors, vehicles, handheld devices, as well as any other device configured to communicate over a network 210. The devices 212 may include subcomponents that have defined states.

The service provider environment 202 may include servers 204/206/208 for executing computing instances (e.g., virtual machines), which may be an instance of a software implementation of a machine (i.e. a computer) that executes applications like a physical machine. The computing instances may host various services associated with the devices 212. The server 208 may include one or more computing instances that host a device shadowing service 218 configured to manage device representations 220 and subcomponent representations 228 associated with the devices 212 and device subcomponents. In one example, the device shadowing service 218 may include a state reporting module 222, a state update module 224, and a device operation module 226.

A device representation 220 may be linked to one or more subcomponent representations 228 that represent the states of subcomponents included in a device 212. For example, a device 212 may include multiple subcomponents, each of which may be represented by a subcomponent representation 228 linked to a device representation 220. A subcomponent representation 228 may represent a recorded state 232 and a desired state 230. As described earlier, a recorded state 232 may be a current state of a device subcomponent as currently know by the device shadowing service 218, and a desired state 230 may be a state that a device subcomponent is to be updated to, such as a state specified by an application or service 216, or a state specified by another device 212.

The state reporting module 222 may be configured to determine a state of a device representation 220 and/or associated subcomponent representations 228 in response to a request. In one example, applications and/or services 216, and/or devices 212 may send a message to the device shadowing service 218 requesting an aggregate of states of a device representation 220 (i.e., an aggregation of recorded states 232 for subcomponent representations 228 linked to the device representation 220), or a recorded state 232 for a particular subcomponent representation 228. A request for a state of a subcomponent representation 228 may be addressed through an associated device representation 220. The request may be provided to the state reporting module 222, which may be configured to query a data store 234 for the recorded states 232 associated with the device representation 220, or a recorded state 232 associated with a particular device representation 220, and returns the recorded state(s) 232 to the application, service, or device that made the request.

In one example, a device 212 may be configured to poll the state reporting module 222 for a desired state 230 of a device representation 220 associated with the device 212, allowing the device 212 to obtain the desired state 230 and assume the desired state 230. More specifically, a device 212 may poll the state reporting module 222 for an aggregation of desired states 230 for subcomponent representations 228 linked to a device representation 220, or poll for a desired state 230 of a particular subcomponent representation 228 linked to a device representation 220. In response to being polled, the state reporting module 222 may be configured to update a recorded state(s) 232 for a subcomponent representation(s) 228 to the desired state 230 provided to the device 212, such that the recorded state 232 represents the current state of the device 212 as known by the device shadowing service 218.

The state update module 224 may be configured to update a desired state 230 of a subcomponent representation 228 in response to a request. In one example, applications and/or services 216, or even other devices 212, may send a message to the device shadowing service 218 requesting that a desired state 230 for a subcomponent representation 228 be updated to a specified state. In response, the state update module 224 may be configured to update the desired state 230 (i.e., update a data record) for the subcomponent representation 228 stored in a data store 234 to the state specified in the message. In some examples, after updating a desired state 230, a device 212 associated with a subcomponent representation 228 may be instructed to assume the state of the desired state 230, and upon receiving an indication that a subcomponent of the device 212 has assumed the desired state 230, the recorded state 232 of the subcomponent representation 228 may be updated to the desired state 230.

In one example, an aggregation of desired states 230 (e.g., a JSON file) for subcomponent representations 228 linked to a device representation 220 may be provided to a device 212, and the device 212 may update subcomponents of the device 212 to the desired states 230. In another example, an individual desired state 230 for a subcomponent representation 228 may be provided to a device 212 and the device 212 may update a device subcomponent associated with the subcomponent representation 228 to the desired state 230.

The device operation module 226 may be configured to execute commands and events associated with devices 212. Illustratively, a command may be used to retrieve state information for a device 212, instruct a device 212 to assume a specified state, or cause the device operation module to execute a function that expands the functionality of a device 212 and/or a linked subcomponent representation 228 beyond a physical configuration or capability of the device 212. As an example, a device representation 220 and linked subcomponent representations 228 may represent a network addressable weather station having subcomponents that include: a temperature sensor, a humidity sensor, and a wind sensor. The device operation module 226 may execute a command that expands the functionality of the weather station by performing an operation that determines a fire danger reading (e.g., "Low", "Moderate", or "High") using the recorded states 232 (temperature, humidity, and wind) of the subcomponent representations 228, thereby expanding the functionality of the weather station beyond simply reporting the states of the weather station's sensors.

An event may be an output from a device representation 220 or an associated device 212. As an example, an event may be a notification that a subcomponent of a device 212 has assumed a desired state 230. Commands and events may be invoked by sending a message or request to the device operation module 226 included in the device shadowing service 218.

In some examples, a device representation 220 may be assigned a representation type that defines states, commands, and events associated with the device representation 220. Likewise, a representation type may be assigned to a subcomponent representation 228 and may define states, commands, and events associated with the subcomponent representation 228. A representation type may be associated with a type schema and a representation type may be assigned a version (allowing for updates to the representation type). A command defined by a representation type may be an instruction that a device representation 220 or subcomponent representation 228 be set to a specified state that an associated device 212 may assume, or a command may cause the execution of a function 214 that extends the physical functionality of a device 212. An event may be an output from a device representation 220, subcomponent representation 228, or associated device 212. For example, an event may be a notification that a device 212 has assumed a desired state 230.

Also, in some examples, canonical models of types, canonical models of commands, and canonical models of events may be declared for use in interacting with devices 212. Canonicalization of types and commands may allow device representations 220 that represent heterogeneous devices 212 to utilize the same type, and allow applications and services 216 to address (e.g., call) devices 212 (via device representations 220) using a command without having to first determine a command structure used by each specific device 212.

Communications associated with devices 212 may be sent and received using a publication/subscription service. In such a service, messages may be published to named logical channels, also referred to as topics, and the messages published to the topics may be received by subscribers to the topics. In another example, communications associated with devices 212 may be implemented using a RESTful API configured to communicate with the device shadowing service 218, devices 212, and applications and services 216 using a Hypertext Transfer Protocol (HTTP). Combinations of named logical channels and RESTful APIs may be used in some examples.

The various processes and/or other functionality contained within the system environment 200 may be executed on one or more processors that are in communication with one or more memory modules. The system environment 200 may include a number of computing devices that are arranged, for example, in one or more server banks or computer banks or other arrangements. The computing devices may support a computing environment using hypervisors, virtual machine monitors (VMMs) and other virtualization software.

Device representations 220 and linked subcomponent representations 228 may be stored in one or more data stores 234. In one example, a key value data store that is external to a device 212 may be used to store a device representation 220 and subcomponent representations 228 associated with the device 212. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the service provider environment 202 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 210 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
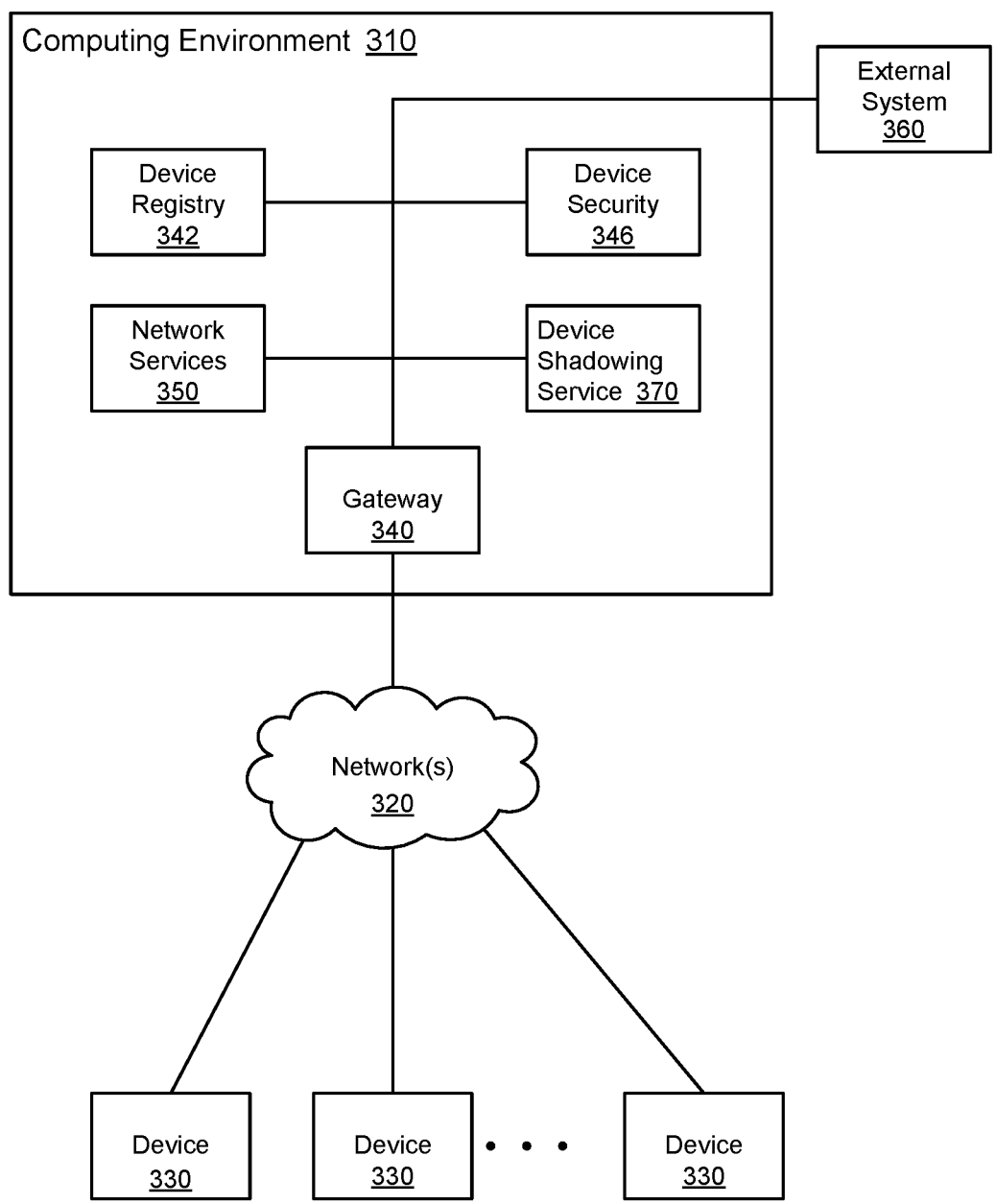
FIG. 3 is a block diagram illustrating an example computer networking architecture for providing devices access to network services.

FIG. 3 is a diagram illustrating an example computing environment 310 with which devices 330 may communicate. The computing environment 310, which may be referred to as a device communication environment or system, comprises various resources that are made accessible via a gateway server 340 to the devices 330 that access the gateway server 340 via a network 320. The devices 330 may access the computing environment 310 in order to access services such as a device shadowing service 370, data storage, and computing processing features. Services operating in the computing environment 310 may communicate data and messages to the devices 330 in response to requests from the devices 330 and/or in response to computing operations within the services.

The computing environment 310 comprises communicatively coupled component systems 340, 342, 346, 350 and 370 that operate to provide services to the devices 330. The gateway server 340 may be programmed to provide an interface between the devices 330 and the computing environment 310. The gateway server 340 receives requests from the devices 330 and forwards corresponding data and messages to the appropriate systems within the computing environment 310. Likewise, when systems within the computing environment 310 attempt to communicate data instructions to the devices 330, the gateway server 340 routes those requests to the correct device 330.

The gateway server 340 may be adapted to communicate with varied devices 330 using various different computing and communication capabilities. For example, the gateway server 340 may be adapted to communicate using either TCP (Transmission Control Protocol) or UDP (User Datagram Protocol) protocols. Likewise, the gateway server 340 may be programmed to receive and communicate with the devices 330 using any suitable protocol including, for example, MQTT (Message Queue Telemetry Transport), CoAP (Constrained Application Protocol), HTTP (Hyper Text Transport Protocol), and HTTPS (Hyper Text Transport Protocol Secure). The gateway server 340 may be programmed to convert the data and instructions or messages received from the devices 330 into a format that may be used by other of the server systems comprised in the computing environment 310. In one example, the gateway server 340 may be adapted to convert a message received using the HTTPS protocol into a JSON (JavaScript Object Notation) formatted message that is suitable for communication to other servers within the computing environment 310.

The gateway server 340 may store, or may control the storing, of information regarding the devices 330 that have formed a connection to the particular gateway server 340 and for which the particular gateway server 340 may be generally relied upon for communications with the device 330. In one example, the gateway server 340 may have stored thereon information specifying the particular device 330 such as a device identifier. For each connection established from the particular device 330, the gateway server 340 may also maintain information identifying the connection. For example, a connection identifier may be generated and stored for each connection established with a particular device 330. Information relating to the particular connection may also be stored. For example, information identifying the particular socket of the gateway server 340 on which the connection was established, as well as information identifying the particular protocol used by the device 330 on the connection may be stored by the gateway server 340. Information such as the socket and protocol may be used in order to facilitate further communications via the particular connection.

In one example, the gateway server 340 may communicate via any suitable networking technology with a device registry server 342. The device registry server 342 may be adapted to track the attributes and capabilities of each device 330. In an example, the device registry sever 342 may be provisioned with information specifying the attributes of the devices 330. The device registry server 342 may comprise data specifying rules or logic (e.g., automation rules) for handling various requests that may be received from the devices 330. The device registry server 342 may be programmed to convert specialized device functions or commands received in particular communication protocols such as, for example HTTPS, MQTT, CoAP, into functions or commands using particular protocols that are understood by other of the servers in the computing environment 310. In one example, the device registry server 342 may be provisioned with information specifying that upon receipt of a particular request from a particular device 330, a request should be made to store the payload data of the request in a particular network service server 350. The device registry server 342 may be similarly programmed to receive requests from servers 342, 350 and convert those requests into commands and protocols understood by the devices 330.

The device shadowing service server 370 maintains state information for each connected device 330. In an example embodiment, the device shadowing service server 370 maintains for each device 330 that has connected to the environment 310 information specifying a plurality of states. In an example scenario, the device shadowing service server 370 may comprise a recorded state and a desired state. The recorded state represents the existing state of the particular device 330 as presently known to the device shadowing service server 370. In an example scenario, for example, the device shadowing service server 370 may identify that the recorded state of a light switch device is "on." The desired state represents a state to which it is desired to change the status. In an example scenario, the device shadowing service server 370 may identify the desired state of a light switch device is "off." The network services server 350 may communicate with the device shadowing service server 370 in order to change the desired state information. The device shadowing service server 370 communicates with the device gateway 340 in order to communicate requests to update a status to a particular device 330. For example, the device shadowing sever 370 may communicate to the device gateway 340 that a particular switch device should have its state changed to "off." The device gateway 340 may, in response, communicate the appropriate command formatted for the particular device.

The device security server 346 maintains security-related information for the devices 330 that connect to the computing environment 310. In one example, the device security server 346 may be programmed to process requests to register devices with the computing environment 310. For example, entities such as device manufacturers, may forward requests to register devices 330 with the computing environment 310. The device security server 346 receives registration requests and assigns unique device identifiers to devices 330 which use the device identifiers on subsequent requests to access the computing environment 310. The device security server 346 stores, for each registered device, authentication information that may be provided during the device registration process. For example, a request to register a device 330 may comprise information identifying the device 330 such as a device serial number and information for use in authenticating the device 330. In one example, the information may comprise a digital certificate and may comprise a public key of a public key-private key pair. The information may be stored in relation to the assigned device identifier for the particular device 330. When the device 330 subsequently attempts to access the computing environment 310, the request may be routed to the device security server 346 for evaluation. The device security server 346 determines whether authentication information provided in the request is consistent with the authentication information stored in relation to the device identifier and provided during the registration process.

The device security server 346 may be further programmed to process request to associate particular entities (individuals or organizations) with particular devices 330. The device security server 346 may be adapted to receive requests to register entities, which may be, for example, individuals, users, accounts, and/or organizations, as authorized to control or communicate with a particular device 330. In one example, a request may be received from an individual or organization that may have purchased a device 330 from a manufacturer. For example, the device may be a dishwasher, thermostat, or lighting assembly that an individual or organization purchased from the manufacturer. The individual or organization may initiate a request to register the device 330 with the individual or an organization with which the organization is associated. The request may be routed to a web services server which may be comprised in computing environment 310 or which communicates the request to the computing environment 310. The request identifies the device 330 and the particular entity (individual or organization) that is requesting to be associated with the device 330. In one example, the request may comprise a unique device identifier that was assigned when the device 330 was registered with the system. The request further may comprise information uniquely identifying the entity that is registering as having authority to communicate with and/or control the particular device 330.

The device security server 346 stores the information identifying the particular entity in relation with the device identifier. When the particular entity subsequently attempts to control or communicate data to the particular device 330, the device security server 346 may use the information to confirm that the particular entity is authorized to communicate with or control the particular device 330. When an entity that has not been registered as being authorized to communicate with the device 330 attempts to communicate with or control the device 330, the device security server 346 may use the information stored in the device security server 346 to deny the request.

A network services server 350 may be any resource or processing server that may be used by any of servers 340, 342, 346, or 370 in processing requests from the devices 330. In one example, network services server 350 may provide data storage and retrieval services and/or on-demand processing capacity. In an example scenario, the network services server 350 may be any of numerous network accessible services including, for example, web or cloud-based services. In one example, the web services server 350 may be programmed to provide particular processing for particular devices 330 and/or groups of devices 330. For example, a network services server 350 may be provisioned with software that coordinates the operation of a particular set of devices 330 that control a particular manufacturing operation.

Servers 340, 342, 346, 350, and 370 may be communicatively coupled via any suitable networking hardware and software. For example, the servers may communicate via a local area network or wide area network.

An external system 360 may access computing environment 310 for any number of purposes. In one example, an external system 360 may be a system adapted to forward requests to register devices 330 with the computing environment 310. For example, an external system 360 may include a server operated by or for a device manufacturer that sends requests to computing environment 310, and device security server 346 in particular, to register devices 330 for operation with computing environment 310. Similarly, the external system 360 may be a system operated to provide a gateway for entities (individuals or organizations) to register an ownership or control relationship with a particular device 330.

The devices 330 may be any devices that may be communicatively coupled via a network 320 with the computing environment 310. For example, the devices 330 may be computing devices such as smart phones and tablet computers, automobiles, appliances such as washers and driers, industrial sensors, switches, control systems, etc. In one example, each of devices 330 may communicate over the network 320 to store data reflecting the operations of the particular device 330 and/or to request processing provided by, for example, network services server 350. While FIG. 3 depicts three devices 330, it will be appreciated that any number of devices 330 may access the computing environment 310 via the gateway server 340. Further it will be appreciated that the devices 330 may employ various different communication protocols. For example, some devices 330 may transport data using TCP, while others may communicate data using UDP. Some devices 330 may use MQTT, while others may use CoAP, and still others may use HTTPs. It will also be appreciated that each of devices 330 may be programmed to send and receive particular functions or commands in its requests that are not compatible with other devices or even the systems within computing environment 310. The gateway server 340 may be programmed to receive and, if needed, attend to converting such requests for processing with the computing environment 310.

Figure 4:
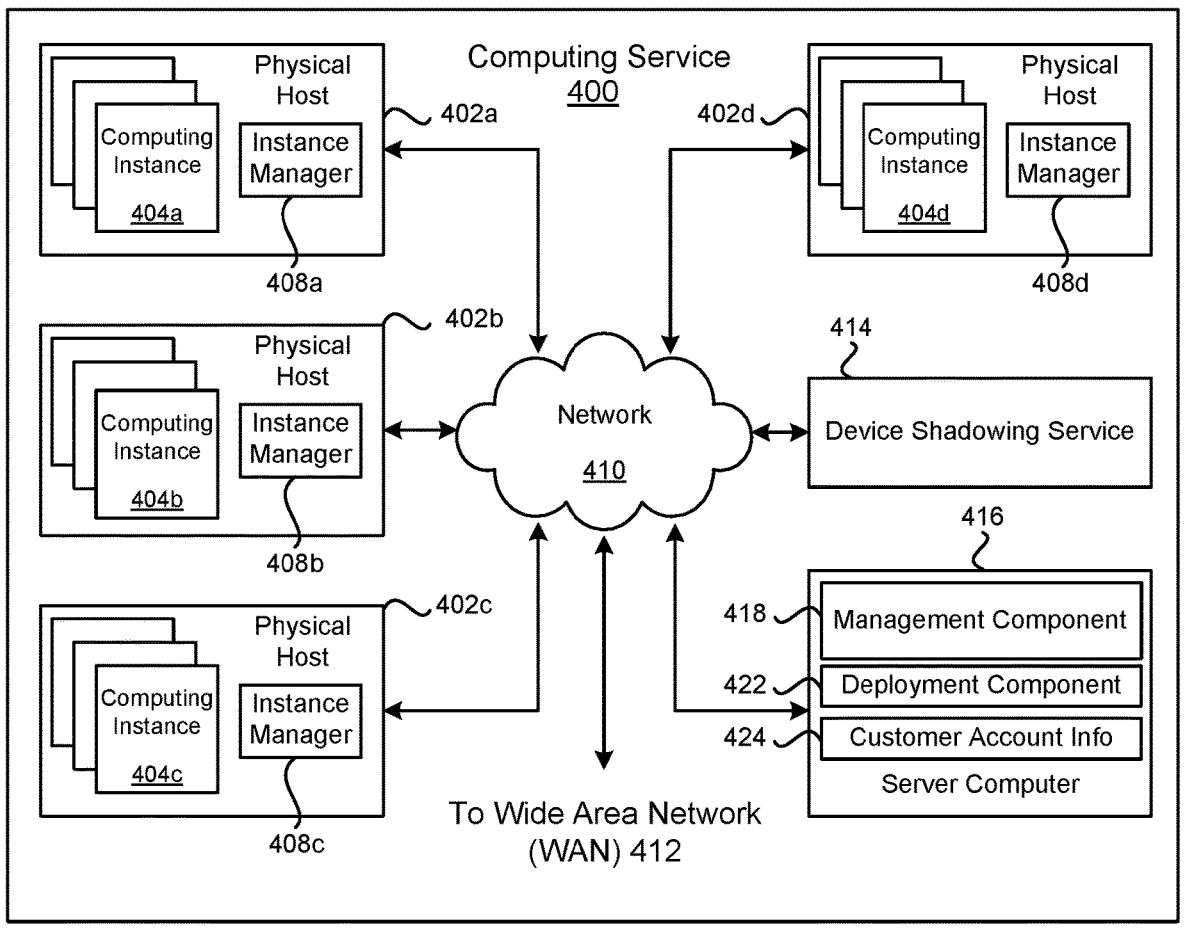
FIG. 4 is a block diagram that illustrates an example computing service environment that includes a device shadowing service.

FIG. 4 is a block diagram illustrating an example computing service 400 that may be used to execute and manage a number of computing instances 404a-d. In particular, the computing service 400 depicted illustrates one environment in which the technology described herein may be used. The computing service 400 may be one type of environment that includes various virtualized service resources that may be used, for instance, to host computing instances 404a-d.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Those familiar with the art will recognize that the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e. a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

One or more server computers 414 and 416 may be reserved to execute software components for managing the operation of the computing service 400 and the computing instances 404a-d. For example, a server computer 414 may execute one or more computing instances that host a device shadowing service. The device shadowing service may be configured to manage device representations and associated subcomponent representations as described earlier.

A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache should be prepared, and other types of information. The deployment component 422 may utilize the customer-provided configuration and cache logic to configure, prime, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4 has been simplified, many more networks and networking devices may be utilized to interconnect the various computing systems disclosed herein.

Figure 5:
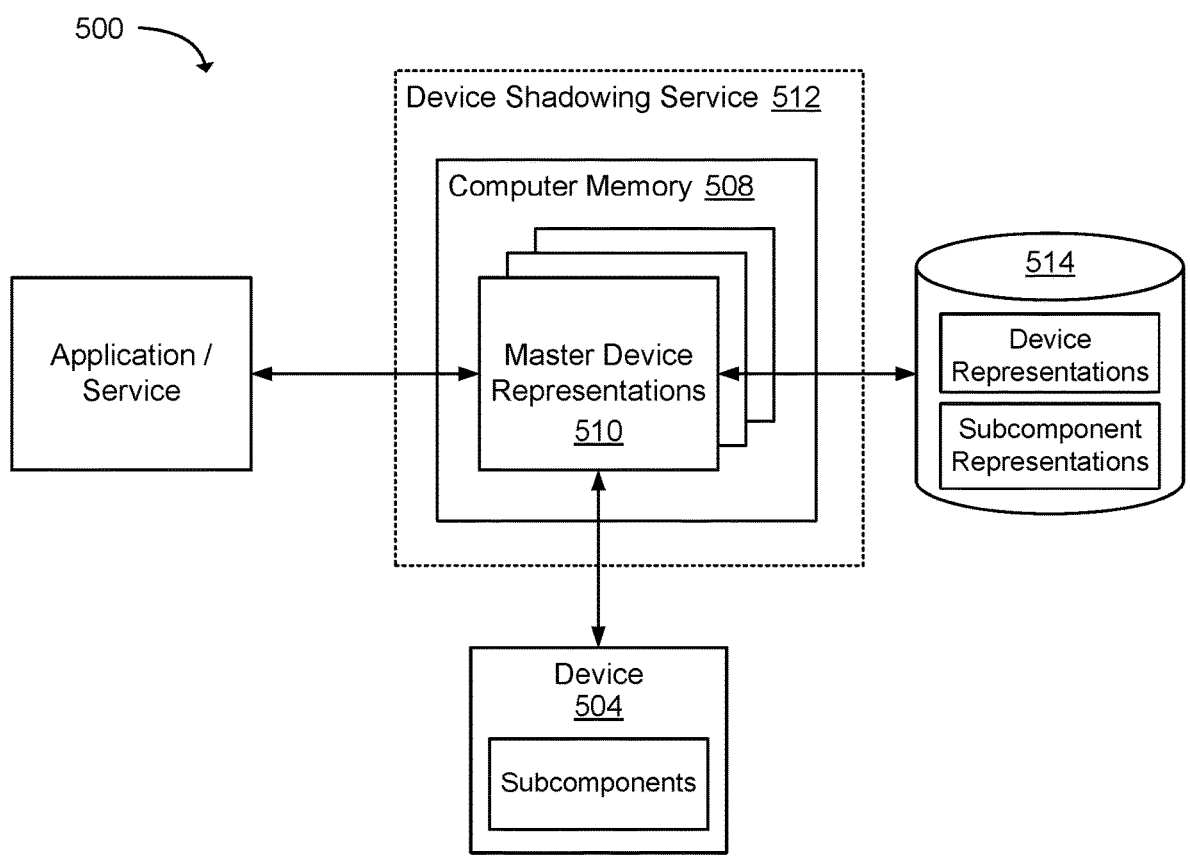
FIG. 5 a block diagram illustrating an example system for high throughput device representations and associated subcomponent representations that are stored in computer memory.

FIG. 5 is a block diagram that illustrates an example system environment 500 for high throughput device representations and associated subcomponent representations that may be stored in computer memory 508, allowing for a high rate of state updates to be performed as compared to state updates performed using device representations and associated subcomponent representations stored in a data store. As illustrated, a device shadowing service 512 may be configured to cache master device representations 510 in computer memory 508 (e.g., Random Access Memory (RAM)) of a server that may be in communication with a device 504 via the one or more networks. A master device representation 510 may include a device representation and associated subcomponent representations that represent a device 504 and subcomponents of the device 504.

By caching a master device representation 510 in computer memory 508, a greater number of transactions per second (TPS) may be performed on the master device representations 510 as compared to a number of TPS that can be performed on device representations and associated subcomponent representations stored in a data store. As requests are received at the device shadowing service 512, the requests may be performed against a master device representation 510 cached in computer memory 508, such that the master device representation 510 represents states (e.g., recorded states and desired states) of a device 504 and device subcomponents. A server hosting the device shadowing service 512 may periodically write the states of a master device representation 510 to a device representation and linked subcomponent representations associated with the master device representation 510 stored in a representation data store 514. As such, in the event that the computer memory 508 experiences a power loss, states represented in the master device representation 510 that have been written to the representation data store 514 may be recoverable.

In one example configuration, a master device representation 510 may be elected to handle requests associated with a device 504, and requests associated with the device 504 may be directed to the master device representation 510. As a more specific example, a number of master device representations 510 may be created in computer memory 508. A hash ring may then be used to elect a master device representation 510 to handle requests associated with a particular device 504. When a request associated with the device 504 is received at the device shadowing service 512, the master device representation 510 elected to handle the request may be identified and the master device representation 510 may be updated according to the request. Periodically, the state(s) of the master device representation 510 may be written out to a device representation and associated subcomponent representations stored in the representation data store 514.

Figure 6:
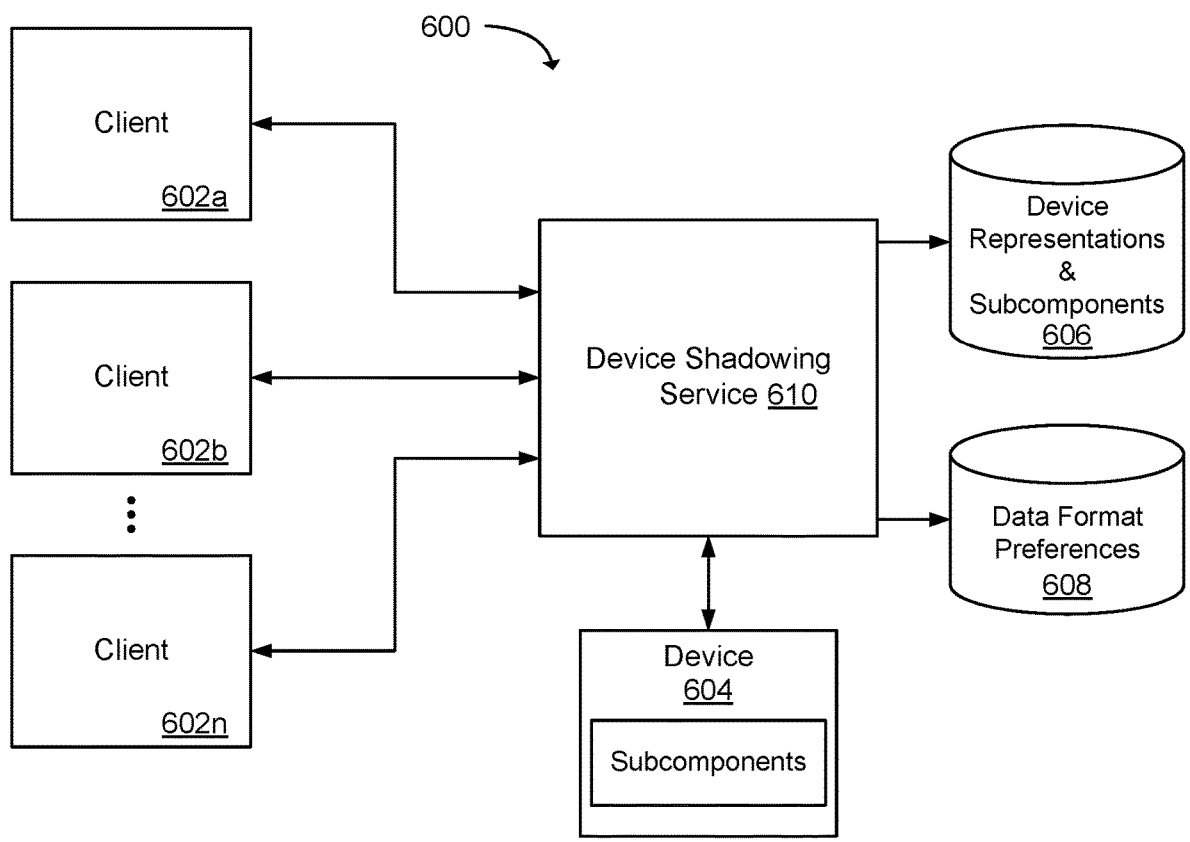
FIG. 6 is a block diagram illustrating an example system for operating a device shadowing service that allows an end recipient to specify a data format for messages sent to the end recipient.

FIG. 6 is a block diagram illustrating an example system 600 for operating a device shadowing service 610 that allows an end recipient to specify a data format for data payloads included in messages sent to the end recipient. In the past, a standard data format, such as JSON, may have been used to provide data to applications, services, devices, and other clients that interact with the device shadowing service 610. As a result, some clients 602a-n and devices 604 may have had difficulty in processing the data due to constraints on computing resources available to the clients 602a-n and devices 604.

The system 600 illustrated allows clients 602a-n and devices 604 to specify a data format preference 608 that may be referenced when sending data to the clients 602a-n and devices 604. In one example, a client 602a-n or device 604 may specify a preferred data format when subscribing to a named logical channel (e.g., topic) associated with a device 604. The preferred data format may be saved to a data store containing data format preferences 608. As an illustration, a first client 602a may subscribe to the topic "$shadow_service/things/device_representation/get" and specify a JSON data format. A second client 602b may subscribe to the same topic and specify a hexadecimal data format, and a third client 602n may subscribe to the topic and specify a BSON (Binary JavaScript Object Notation) data format.

After a client 602a-n or device 604 subscribes to a topic and specifies a data format preference 608, messages published to the topic intended for the client 602a-n or device 604 may be published using the data format preference 608 of the end recipient. For example, in publishing a message to a topic, the device shadowing service 610 may query a data store for a data format preference 608 associated with an end recipient (e.g., a client 602a-n or a device 604) and query a data store for state information for a device representation and associated device subcomponent(s) 606 and format the state information according the data format preference 608.

Figure 7:
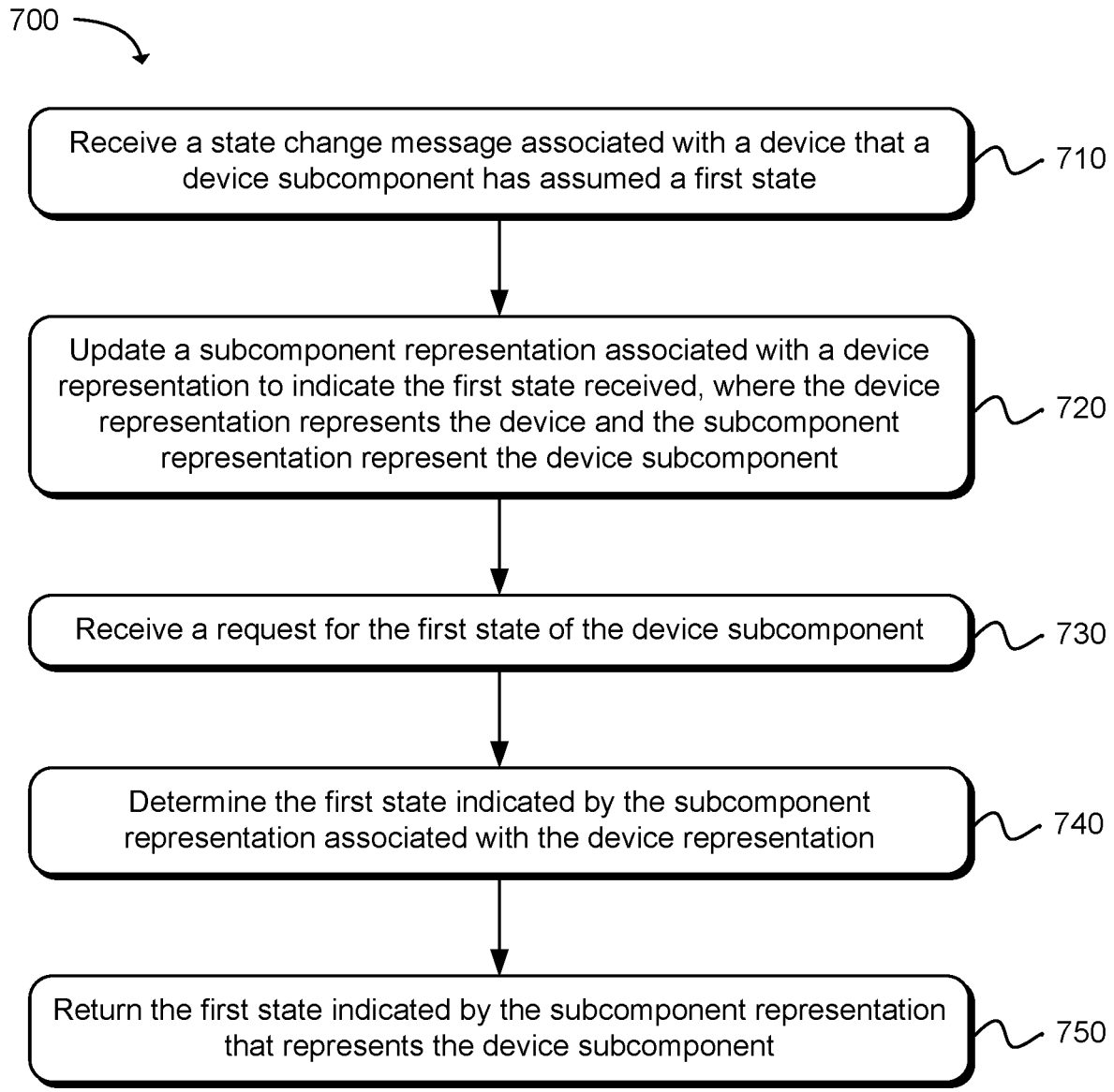
FIG. 7 is a flow diagram that illustrates an example method for operating a device shadowing service that manages device states for devices.

FIG. 7 is a flow diagram illustrating an example method 700 for operating a device shadowing service that manages device states for devices. A device may connect to the device shadowing service over one or more networks and the device shadowing service may maintain a device representation and associated subcomponent representations that represent the states of the device and subcomponents of the device.

Starting in block 710, a state change message associated with a device may be received at a device shadowing service. The state change message may indicate that a subcomponent of the device has assumed a first state. As an illustration, a network addressable appliance may include a fridge subcomponent and a freezer subcomponent. The appliance may send a state change message to the device shadowing service indicating that the fridge temperature is 35° F.

As in block 720, a subcomponent representation associated with a device representation may be updated to indicate the first state received in the state change message. As an illustration, a subcomponent representation associated with the fridge subcomponent described above may be updated to indicate that the state of the fridge subcomponent is 35° F.

As in block 730, a request for the first state of the subcomponent of the device may be received at the device shadowing service, whereupon, as in block 740, the first state indicated by the subcomponent representation associated with the device representation may be determined, and as in block 750, the first state indicated by the subcomponent representation associated with the device subcomponent may be returned. Continuing the illustration above, a request for the state of the fridge subcomponent may be received by the device shadowing service, which may identify a device representation associated with the appliance and a subcomponent representation associated with the fridge subcomponent. The state of the fridge subcomponent (e.g., fridge temperature 35° F.) may be determined and returned to an end recipient.

In one example, a request that indicates a desired value for an additional state of the subcomponent of the device may be received at the device shadowing service. The additional state may indicate a characteristic based in part on the subcomponent of the device that transitions in association with the first state. The state of a subcomponent representation may be updated to the desired value and an indication of the desired value may be sent to the device, which may update the subcomponent to the desired value. As an illustration, an application may send a state change message to the device shadowing service that includes a temperature value (e.g., 38° F.) to which the fridge subcomponent described above is to be updated to. The device shadowing service may identify the device representation for the appliance and the subcomponent representation for the fridge subcomponent and update the state of the fridge subcomponent to the temperature value (e.g., 38° F.) included in the state change message. The device shadowing service may then send a message to the appliance that includes the temperature value, and the appliance may set the temperature of the fridge component to the temperature value (e.g., 38° F.).

Figure 8:
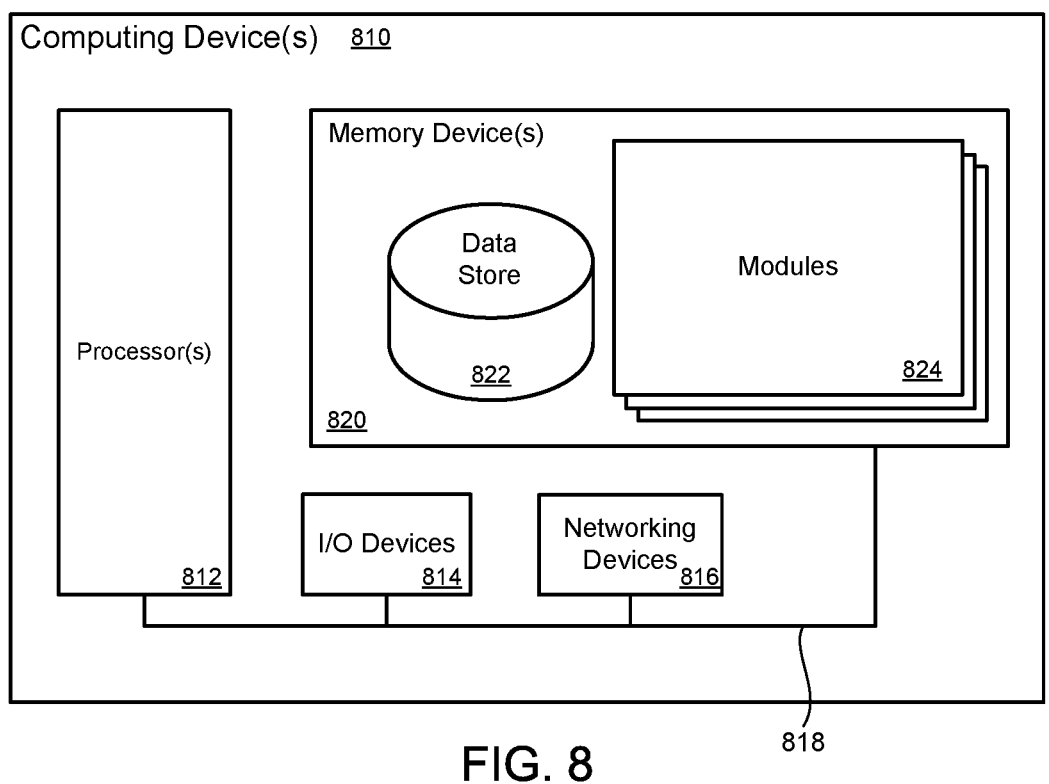
FIG. 8 is block diagram illustrating an example of a computing device that may be used to execute a method for operating a device shadowing service.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. In one example, the memory device 820 may include a state reporting module, a state update module, a device operation module, and other modules. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for operating a device shadowing service that manages device states, comprising:
   at least one processor; and
   a memory including instructions that, when executed by the at least one processor, cause the system to:
      receive a state change message indicating that the-at least one physical device subcomponent contained within a device has assumed a first state, wherein the device connects to the device shadowing service over one or more networks;
      update a recorded state of a subcomponent representation associated with a device representation to indicate the first state, wherein the device representation represents the device and a subcomponent representation represents the at least one physical device subcomponent, and the subcomponent representation is addressed through the device representation, and wherein the device shadowing service maintains the device representation and the subcomponent representation;
      receive a request for the at least one physical device subcomponent to assume a second state that is different from the first state;
      update a desired state of the subcomponent representation associated with the device representation to indicate the second state;
      send instructions to the device to have the at least one physical device subcomponent assume the second state;
      receive an indication that the at least one physical device subcomponent has assumed the second state; and
      update the recorded state of the subcomponent representation associated with the device representation to indicate the second state.

2. The system of claim 1, wherein the memory further includes instructions that, when executed by the at least one processor, causes the system to:
   compare the desired state of the subcomponent representation with the recorded state of the subcomponent representation; and determine that the desired state and the recorded state are different, resulting in sending the instructions to the device to have the at least one physical device subcomponent assume the second state.

3. The system of claim 1, wherein the memory further includes instructions that, when executed by the at least one processor, causes the system to:
   receive a request for the recorded state of the at least one physical device subcomponent; determine the recorded state of the subcomponent representation associated with the device representation; and return the recorded state of the subcomponent representation associated with the device representation.

4. The system of claim 1, wherein the memory further includes instructions that, when executed by the at least one processor, causes the system to receive a message invoking a command associated with the subcomponent representation that expands functionality of the at least one physical device subcomponent using a service provider environment.

5. A computer: implemented method implemented by a device shadowing service, the computer-implemented method comprising:
   receiving a state change message, associated with a device that has a physical device subcomponent contained within the device, indicating that the physical device subcomponent has a first state, wherein the device and the physical device subcomponent are ultimately addressable by a device shadowing service configured to manage states of the device and the physical device subcomponent over one or more computer networks;
   updating a subcomponent representation associated with a device representation to indicate the first state received, wherein the device representation is configured to represent the device and the subcomponent representation is configured to represent the physical device subcomponent, and the device shadowing service maintains the device representation and the subcomponent representation;
   receiving a request for the physical device subcomponent to assume a second state that is different from the first state;
   updating a desired state of the subcomponent representation associated with the device representation to indicate the second state;
   sending instructions to the device to have the physical device subcomponent assume the second state;
   receiving an indication that the physical device subcomponent has assumed the second state; and
   updating the subcomponent representation associated with the device representation to indicate the second state.

6. The method of claim 5, further comprising:
   receiving a request that indicates a desired value for an additional state of the physical device subcomponent, wherein the additional state indicates a characteristic based in part on the physical device subcomponent; and
   sending an indication of the desired value to the device.

7. The computer-implemented method of claim 6, further comprising receiving an indication that the physical device subcomponent has assumed the additional state.

8. The computer-implemented method of claim 5, wherein the subcomponent representation is addressed through the device representation.

9. The computer-implemented method of claim 5 further comprising:
   receiving a request for a state of the device;
   determining what state is indicated by the subcomponent representation associated with the device representation, wherein determining which state is indicated by the subcomponent representation comprises:
  determining states for a plurality of subcomponent representations associated with the device; and
  aggregating the states for the plurality of subcomponent representations to result in a determined state; and
returning the determined state in response to the request.

10. The computer-implemented method of claim 5, wherein the device representation and the subcomponent representation are cached in computer memory of a server that is in communication with the device via the one or more networks.

11. The computer-implemented method of claim 10, wherein the server periodically writes states of the device representation and the subcomponent representation to a data store hosted in a service provider environment.

12. The computer-implemented method of claim 10, further comprising:
  electing a master device representation stored in the computer memory to handle requests associated with the device; and
  directing the requests associated with the device to the master device representation.

13. The computer-implemented method of claim 5, wherein requests received at the device shadowing service comply with a canonical model of requests that defines a request structure and request content.

14. The computer-implemented method of claim 5, wherein requests are received using a publication/subscription channel where messages are published to named logical channels and the messages published to the named logical channels are received by the device shadowing service, the device, and applications subscribed to the named logical channels.

15. The computer-implemented method of claim 5, wherein requests are received using a Representational State Transfer based (RESTful) API configured to communicate with the device shadowing service, the device, and applications using a Hypertext Transfer Protocol (HTTP).

16. The computer-implemented method of claim 5, wherein the device representation and the subcomponent representation are stored in one or more key value data stores external to the device.

17. One or more non-transitory machine readable storage media having instructions embodied thereon, wherein the instructions when executed by at least one processor of a device shadowing service cause the device shadowing service to:
  receive a state change message indicating that a physical device subcomponent contained within a device has assumed a first state, wherein the device connects to the device shadowing service over one or more networks;
  update a subcomponent representation associated with a device representation to indicate the first state, wherein the device representation represents the device and a subcomponent representation represents the physical device subcomponent, wherein the subcomponent representation is addressed through the device representation, and wherein the device shadowing service maintains the device representation and the subcomponent representation;
  receive a request for the physical device subcomponent to assume a second state that is different from the first state;
  update a desired state of the subcomponent representation associated with the device representation to indicate the second state;
  send instructions to the device to have the physical device subcomponent assume the second state;
  receive a message associated with the device indicating that the physical device subcomponent has assumed the second state; and
  update the subcomponent representation to indicate the second state.

18. The one or more non-transitory machine readable storage media as in claim 17, wherein the instructions when executed by the at least one processor further assign a representation type to the device representation that defines states, commands, and events associated with the device representation and the subcomponent representation.

19. The one or more non-transitory machine readable storage media as in claim 17, wherein the instructions when executed by the at least one processor further store the device representation to a first data store location and store the subcomponent representation to a second data store location.

20. The non-transitory machine readable storage media as in claim 17, wherein messages associated with the physical device subcomponent are published to a named logical channel associated with the subcomponent.

21. The non-transitory machine readable storage media as in claim 17, wherein the instructions when executed by the at least one processor further receive instructions specifying a data format for data sent to an end recipient via a named logical channel associated with the device.

* * * * *